United States Patent [19]

McIntosh

[11] Patent Number: 4,561,529
[45] Date of Patent: Dec. 31, 1985

[54] TORQUE-LIMITING CLUTCH WITH TEMPERATURE-RESPONSIVE RAPID RELEASE MECHANISM

[75] Inventor: Arthur M. McIntosh, Arlington Heights, Ill.

[73] Assignee: Borg-Warner Corporation, Chicago, Ill.

[21] Appl. No.: 528,920

[22] Filed: Sep. 2, 1983

[51] Int. Cl.[4] .............................................. F16D 43/25
[52] U.S. Cl. ................................. 192/56 R; 192/82 T
[58] Field of Search ................. 192/56 R, 82 T, 70.27, 192/85 AA

[56] References Cited

U.S. PATENT DOCUMENTS

| | | | |
|---|---|---|---|
| 2,655,015 | 10/1953 | Linder | 192/56 R X |
| 3,331,482 | 7/1967 | Keramas | 192/70.27 X |
| 3,477,554 | 11/1969 | Schiffer | 192/81 |
| 3,730,151 | 5/1973 | Smith et al. | 192/82 T X |
| 3,903,712 | 9/1975 | Richter et al. | 64/30 E |
| 4,220,231 | 9/1980 | Richter et al. | 192/82 T |
| 4,271,951 | 6/1981 | Nishimura et al. | 192/85 AA |
| 4,287,975 | 9/1981 | Tuzson | 192/82 T |
| 4,290,393 | 9/1981 | Hart et al. | 192/82 T X |
| 4,373,924 | 2/1983 | Schuhmacher | 192/56 R X |

FOREIGN PATENT DOCUMENTS 134017  8/1982  Japan .................................. 192/82 T

*Primary Examiner*—Leonard E. Smith
*Attorney, Agent, or Firm*—Julian Schachner

[57] ABSTRACT

A torque-limiting clutch includes an input member, an output member, and a friction element relatively movable to an engaged position for frictionally engaging the clutch and to a disengaged position in which the clutch is disengaged. An actuating device develops a clutch-engaging force tending to move the friction element relatively to its engaged position and thereby effect clutch engagement at a predetermined torque load setting. A thermal spring responsive to a small temperature increase develops a clutch-disengaging force tending to move the friction element relatively to its disengaged position and thereby effect rapid clutch disengagement. The thermal spring is formed from a shape memory effect material.

6 Claims, 3 Drawing Figures

TORQUE-LIMITING CLUTCH WITH TEMPERATURE-RESPONSIVE RAPID RELEASE MECHANISM

BACKGROUND OF THE INVENTION

This invention relates generally to a torquelimiting clutch. More particularly, it relates to a torque-limiting clutch which includes a mechanism to effect rapid clutch release upon the sensing of a relatively low excessive temperature so as to reduce slipping and prevent clutch destruction or more extensive damage to associated equipment.

It is well known in the prior art to provide a gear, chain or belt drive train, for example, to couple a source of input torque with an output which drives associated equipment. Often a torque-limiting clutch is included to protect such equipment by disengaging the drive train when it is overloaded. In the event torque transferred through the drive train increases due to overloading, jamming, etc., the clutch friction elements slip, thereby producing wear and destructive heat.

The typical temperature-responsive torque-limiting clutch tends to disengage when this occurs. It usually includes a temperature-responsive bimetallic spring to separate the friction elements in response to the sensing of an excessive temperature. However, a bimetallic spring generally deforms slowly in response to temperature changes through a wide temperature range. As a result, separation of the friction elements takes place at a relatively high temperature, for example above 300° F. The friction elements continue to slip during the transient period in which the bimetallic spring deforms. Indeed, slippage increases during this transition, producing additional wear and heat. Further, the torque setting of the cluch decreases as the bimetallic spring force increasingly opposes the force tending to keep the clutch engaged.

There is a need in the art for a torque-limiting clutch including a temperature-responsive release mechanism which will rapidly effect clutch disengagement when a relatively low excessive temperature is sensed. Rapid disengagement at a low temperature minimizes wear, heat damage and changes in the torque setting, thereby protecting the clutch and associated equipment.

In addition, it is often necessary to use a torquelimiting clutch in an environment where space limitations are severe. The use of a bimetallic spring in such an environment often presents a problem, because the spring must be relatively large to insure that sufficient clutch-disengaging force is developed. Thus, there also is a need in the art to provide a torquelimiting clutch in a small package.

Further, it would be a desirable feature for such a clutch to have the capability either of cycling to re-engage when the temperature drops or of remaining disengaged, as desired.

SUMMARY OF THE INVENTION

This invention is directed to apparatus which meets these needs. The apparatus incorporates a torquelimiting clutch (dry or wet) which may be interposed in the drive train between a power source and equipment driven thereby. The clutch is engaged by an actuating spring, fluid pressure, or the like. A thermal spring formed from a shape memory effect (SME) material is included. The arrangement is such that the thermal spring effects clutch disengagement rapidly when a relatively low excessive temperature is sensed, thereby minimizing slippage of the clutch friction elements and thus reducing damage to the clutch and associated equipment.

The thermal spring is oriented within the clutch assembly so as to maintain a small overall clutch package. The SME material from which the thermal spring is formed can be selected such that once disengagement has taken place, the clutch either re-engages upon cooling or remains disengaged until the thermal spring is replaced.

BRIEF DESCRIPTION OF THE DRAWING

The objects and advantages of this invention will become apparent to those skilled in the art upon careful consideration of the specification herein, including the drawing, wherein.

Figure 1:
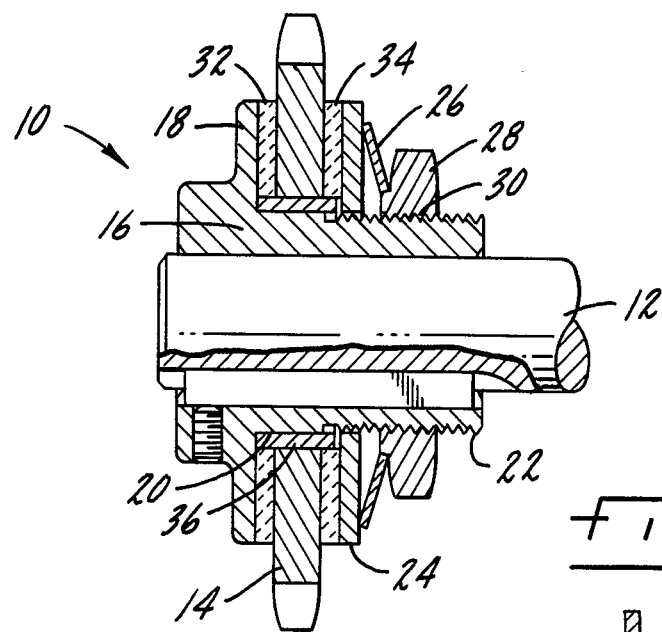
FIG. 1 is a sectional view of a torque-limiting clutch in the form of a dry clutch incorporating the temperature-responsive rapid release mechanism of this invention.

While this invention is susceptible of embodiment in many different forms, the preferred embodiment and a modified form thereof are shown in the drawing and will be described in detail. It should be understood that the present disclosure is considered to be an exemplification of the principles of the invention, and is not intended to limit the invention to this embodiment.

DESCRIPTION OF THE PREFERRED EMBODIMENT

Referring to FIG. 1 in further detail, there is shown a torque-limiting clutch 10 and an associated shaft 12. Clutch 10 is shown as a dry clutch by way of example. Shaft 12 may be either the input or output member of a suitable drive train. Assuming, for example, that shaft 12 is an input member, a gear, sprocket, pulley or the like could be provided as an output member 14. By way of example, output member 14 is shown as a sprocket.

Clutch 10 includes a hub 16 secured to shaft 12 for rotation therewith. Hub 16 defines a radially extending backing plate 18 and an axially extending annular surface 20. Hub 16 also defines threads 22.

A pressure plate 24 is slidable axially over threads 22, and is biased by an actuating spring 26, in the form of a Bellville washer or the like, to the left as shown in FIG. 1. Actuating spring 26 is supported by an adjusting nut 28 having threads 30 which engage threads 22 of hub 16. The clutch-actuating force of spring 26 is predetermined by the axial position of nut 28.

A suitable friction element 32 is interposed between sprocket 14 and backing plate 18. Similarly, a suitable friction element 34 is interposed between sprocket 14 and pressure plate 24.

A temperature-responsive thermal spring 36 is supported on annular surface 20 of hub 16. In the preferred form of the invention, thermal spring 36 is annular, and is oriented within the clutch assembly so as to serve as a bushing for sprocket 14. The length of the bushing is predetermined to allow a range of torque load settings for clutch 10 while maintaining a minimum clearance from pressure plate 24.

Thermal spring 36 is formed from an SME material. SME materials are well known in the art, and the particular material used forms no part of the present invention. Such a material may deform axially or radially, elongate or shorten, and/or take a permanent set or return to its original configuration, all in response to changes in temperature. In the preferred form of the invention, thermal spring 36 is formed from an SME material which elongates rapidly in response to an increasing temperature within a very narrow temperature range. Spring elongation effectively takes place at a relatively low temperature level, preferably well below 300° F.

Operation of the torque-limiting clutch shown in FIG. 1 will be readily apparent to those skilled in the art. Actuating spring 26 develops a clutch-engaging force tending to move friction elements 32 and 34 relatively to an engaged position in frictional contact with sprocket 14, backing plate 18 and pressure plate 24. Clutch 10 is thus engaged, and torque may be transferred between shaft 12 and sprocket 14. The actuating force of spring 26 determines the torque load setting of the clutch. Thermal spring 36 normally is spaced slightly from pressure plate 24, and thus normally would not develop a spring force.

In the event the torque capacity of clutch 10 is exceeded, friction elements 32 and 34 slip relative to sprocket 14, backing plate 18 and pressure plate 24. This slippage generates heat, and the resulting temperature increase is sensed by thermal spring 36. Possible slippage between sprocket 14 and thermal spring 36 also could generate heat. This too would be sensed by thermal spring 36. At a relatively low temperature level, for example 240° F., thermal spring 36 elongates rapidly and applies a clutch-disengaging force on pressure plate 24 in opposition to the clutchengaging force of actuating spring 26. This moves friction plates 32 and 34 relatively to a disengaged position out of frictional contact with sprocket 14, backing plate 18 and pressure plate 24. Clutch 10 rapidly disengages, thereby minimizing slippage during the transient period between clutch engagement and clutch disengagement.

As noted above, the SME material from which thermal spring 36 is formed may be selected to take a permanent set, in which case clutch 10 will remain disengaged until thermal spring 36 is replaced. Alternatively, it may be formed from a material which returns to its original configuration as the sensed temperature decreases, in which case clutch 10 will be re-engaged under the influence of actuating spring 26. This allows time for corrective action to relieve the cause of overloading.

By forming thermal spring 36 as a bushing which supports sprocket 14 on hub 16, the overall size of clutch 10 need not be increased from that of similar clutches found in the prior art. Thus, the clutch package may be used in areas where severe space limitations are encountered. Also, existing clutches may be modified simply and easily in the field to incorporate this rapid release mechanism.

Figure 3:
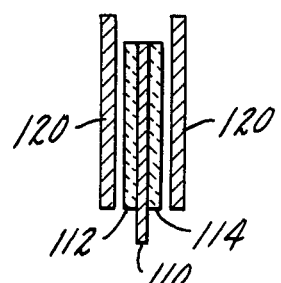
FIG. 3 is a detailed view of a portion of the wet clutch of FIG. 2.
Figure 2:
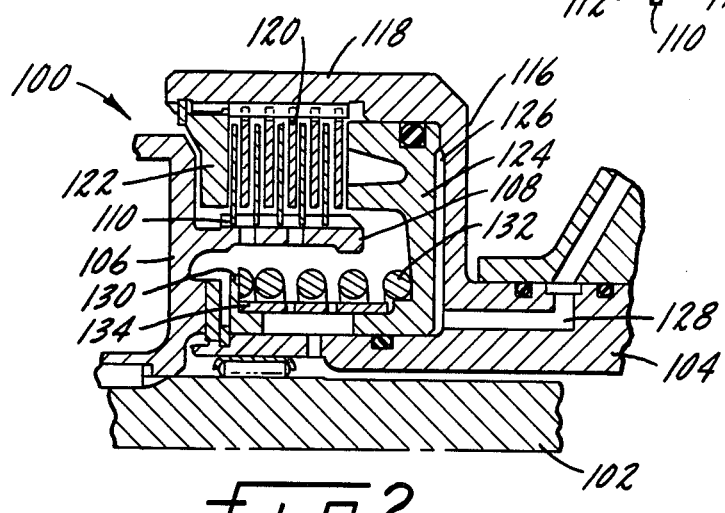
FIG. 2 is a sectional view of a torque-limiting clutch in the form of a wet clutch incorporating a modified form of the temperature-responsive rapid release mechanism of this invention.

A modified form of the torque-limiting clutch of this invention is shown in FIGS. 2 and 3. A torque-limiting clutch 100 is used in association with a shaft 102 and a quill 104, for example. In this modified form, clutch 100 is shown as a wet clutch, also by way of example.

An inner clutch member 106 is secured to shaft 102 for rotation therewith. Clutch member 106 includes an annularly extending inner drum 108. A plurality of clutch plates 110 are splined to drum 108 so as to be rotatable therewith and axially slidable relative thereto. Facings in the form of friction elements 112 and 114 are secured to clutch plates 110.

An outer clutch member 116 is a radial extension of quill 104 and rotates therewith. Clutch member 116 includes an annularly extending outer drum 118. A plurality of clutch plates 120 are splined to drum 118 so as to be rotatable therewith and axially slidable relative thereto. Clutch plates 110 and 120 are interleaved to provide a significant frictional contact area when clutch 100 is engaged.

A backing plate 122 is secured to drum 118 of clutch member 116. A pressure plate 124 in the form of a piston is slidably received within a chamber 126 formed by clutch member 116 and quill 104. Chamber 126 communicates through a suitable fluid passage 128 with a source of fluid pressure (not shown).

When fluid pressure is introduced into chamber 126, a clutch-engaging force is developed which tends to move clutch plates 110 and 120 to the left as shown in FIG. 2. Friction elements 112 and 114 are moved relatively to an engaged position in frictional contact with clutch plates 120 and backing plate 122, thereby engaging clutch 100.

A radially extending reaction member 130 is secured to quill 104. A biasing spring 132 reactes against member 130 and develops a clutch-disengaging force acting on piston 124 to bias it to the right as shown in FIG. 2, where friction elements 112 and 114 are in a disengaged position out of frictional contact with clutch plates 120 and backing plate 122.

A temperature-responsive thermal spring 134 is interposed between reaction member 130 and piston 124. In the preferred form of the invention, thermal spring 134 is annular and is contained within biasing spring 132. Thermal spring 134 preferably is formed from the same SME material as is thermal spring 36 of clutch 10.

In the event the torque capacity of clutch 100 is exceeded, slippage will occur between friction elements 112 and 114 relative to backing plate 122 and clutch plates 120. This slippage generates heat, and the increasing temperature is sensed by thermal spring 134. When the temperature increases to a predetermined level, for example 280° F., thermal spring 134 elongates and develops a clutch-disengaging force which supplements the force of biasing spring 132. The combined spring forces are designed to overcome the clutch-engaging force developed by fluid pressure in chamber 126. This moves piston 124 rapidly to the right as shown in FIG. 2, effectively disengaging clutch 100. Rapid disengagement minimizes slippage during the transient period.

As noted above with regard to thermal spring 36, the SME material from which thermal spring 134 is formed may be either one which takes a permanent set, or one which returns to its original configuration as the temperature decreases.

Thermal spring 134 is placed within the confines of biasing spring 132 so as to minimize or indeed eliminate the necessity for an increased package size. Thus clutch 100 also may be used in environments where space limitations are severe. Modification of existing clutches in the field also is easy and simple.

There are disclosed two forms of a torque-limiting clutch provided with a temperature-responsive release mechanism which will rapidly disengage the clutch in the event an overload condition is encountered. By rapidly disengaging, the mechanism of the clutch disclosed herein prevents an excessive temperature increase above the level at which disengagement takes place. This may very well prevent clutch destruction, or more extensive damage to associated equipment.

If desired, biasing springs 26 and 132 also could be formed from SME materials. (Biasing spring 26 would be formed from a material which shortens with increasing temperature). In this case the differential force of springs 26 and 36, or the combined forces of springs 132 and 134, would effect even more rapid clutch disengagement in the event of an overload condition.

The clutch of this invention can be designed to ignore random overload conditions of short duration. Such conditions might occur, for example, at motor start-up where the heat developed is low or quickly dissipated, or both.

It is apparent that although the invention disclosed herein provides an arrangement for rapidly disengaging a torque limiting clutch in response to the sensing of a temperature increase to a predetermined level, it is readily adaptable for use in other environments where similar operating characteristics may be desired.

It should be understood that while the preferred embodiment of the invention and one modified form thereof have been shown and described, this is to be considered as illustrative and may be further modified by those skilled in the art. It is intended that the claims herein cover all such modifications as may fall within the spirit and scope of the invention.

What is claimed is:

1. A torque-limiting clutch comprising an input member, an output member, a hub secured to one of said members, at least one friction element movable relative to at least one of said members to an engaged position for frictionally engaging said clutch and to a disengaged position in which said clutch is disengaged, means developing a clutch-engaging force tending to move said friction element relatively to its engaged position and thereby effect clutch engagement at a predetermined torque load setting, and rapid release means responsive to the sensing of a temperature increase to a predetermined level for developing a clutch-disengaging force tending to move said friction element relatively to its disengaged position and thereby effect clutch disengagement, said rapid release means including a thermal spring formed from an SME material, said thermal spring including a bushing supporting the other of said members on said hub.

2. The torque-limiting clutch of claim 1, said thermal spring being constructed and arranged to develop said clutch-disengaging force substantially below 300° F.

3. The torque-limiting clutch of claim 1, said clutch-engaging means including an actuating spring developing said clutch-engaging force, and means for adjusting the force of said actuating spring to thereby predetermine said torque load setting.

4. A torque-limiting clutch comprising an input member, an output member, at least one friction element movable relative to at least one of said members to an engaged position for frictionally engaging said clutch and to a disengaged position in which said clutch is disengaged, a fluid-actuated piston developing a clutch-engaging force tending to move said friction element relatively to its engaged position and thereby effect clutch engagement at a predetermined torque load setting, a biasing spring developing a clutch-disengaging force acting on said piston, and rapid release means responsive to the sensing of a temperature increase to a predetermined level for developing a clutch-disengaging force tending to move said friction element relatively to its disengaged position and thereby effect clutch disengagement, said rapid release means including a thermal spring formed from an SME material, said thermal spring developing a clutchdisengaging force sufficient to effect rapid disengagement of said clutch in response to the sensing of a temperature increase to a predetermined level.

5. The torque-limiting clutch of claim 4, said thermal spring being constructed and arranged to develop said clutch-disengaging force substantially below 300° F.

6. The torque-limiting clutch of claim 5, said thermal spring being contained within said biasing spring.

* * * * *